Aug. 20, 1968   W. B. ELMER   3,398,272
ISORADIANT ENERGY REFLECTING
Filed Dec. 3, 1965

INVENTOR.
WILLIAM B. ELMER
BY
Wolf, Greenfield & Hieken
ATTORNEYS

United States Patent Office 3,398,272
Patented Aug. 20, 1968

3,398,272
ISORADIANT ENERGY REFLECTING
William B. Elmer, Thornton, N.H.
(113 Pinckney St., Boston, Mass. 02114)
Filed Dec. 3, 1965, Ser. No. 512,042
8 Claims. (Cl. 240—41.35)

ABSTRACT OF THE DISCLOSURE

Non-spherical reflecting surfaces differ slightly from spheroidal and hyperboloidal so that each point on the surface facing a focal point located on the axis of the reflector is oriented so that rays incident from the focal point upon each point of the reflecting surface emerge from the reflecting surface to define a bundle of non-parallel rays forming a beam of substantially uniform intensity in response to an isoradiant energy source at the radiant energy center corresponding essentially to the focal point of the reflecting surface.

---

The present invention relates in general to radiant energy reflecting and more particularly concerns a novel nonspherical reflecting surface responsive to an isoradiant energy source located at the radiation center of the reflecting surface for providing a bundle of nonparallel rays forming a beam of radiant energy of substantially uniform intensity throughout the solid angle of the radiant energy beam.

If a light reflector is constructed of a portion of a spheroidal surface corresponding substantially to an ellipse rotated about its major axis, which surface includes the apex and embraces the first local point and terminates at a plane passing through the second focus and perpendicular to the major axis, all energy originating at the first focus and reflected from the reflecting surface will, after passing through the second focus, escape in a beam through the open end of the spheroidal reflector. The beam so formed will not be uniform in intensity, but concentrated more heavily in the direction of the major axis with intensity diminishing as the direction departs from that of the major axis. Correspondingly, a reflecting surface having the form of a hyperbola of revolution will, when an energy source is located at the first focus embraced by the surface, provide a reflected beam with rays directed radially outward from the second focus outside the surface which is also of nonuniform intensity that is heavier when the direction is along the axis of revolution and less dense as the direction moves away from the axis of revolution.

There are a number of radiant energy systems where it is desired to employ a reflecting surface for providing a beam of radiant energy of substantially uniform intensity throughout the solid angle which subtends the beam. Accordingly, it is an important object of this invention to provide a reflecting surface responsive to an enclosed isoradiant source for providing a beam of radiant energy of substantially uniform intensity throughout the solid angle subtended thereby.

It is another object of the invention to provide a reflector in accordance with the preceding object for providing a beam of light.

It is a further object of the invention to provide a reflector in accordance with the preceding object for providing a beam of radio frequency energy.

It is a further object of the invention to provide generally spheroidal and generally hyperboloidal reflectors in accordance with the preceding objects having isoradiant properties.

According to the invention, a reflecting surface is described by a curve defined in polar coordinates by the product of the ratio of algebraic combinations of a function of the angle between the axis including the reflecting surface apex and focal points and a radial line from the origin to the curve with another ratio of another algebraic combination taken to a power related to the angle between the radius to the outer edge of the reflecting surface and the axis and the angle between the margin of the reflected beam and the axis.

Numerous other features, objects and advantages of the invention will become apparent from the following specification when read in connection with the accompanying drawing in which.

Figure 1:
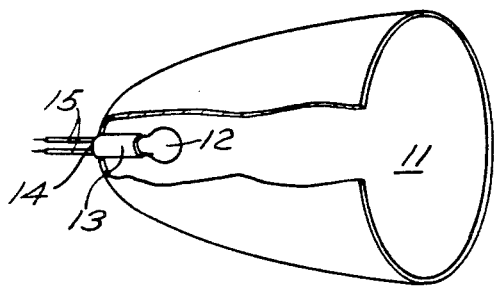
FIG. 1 is a generally quasi-spheroidal reflecting surface according to the invention.
Figure 2:
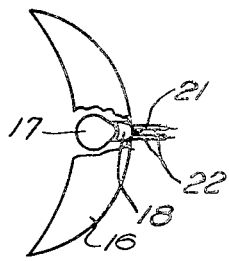
FIG. 2 is a generally quasi-hyperboloidal reflecting surface according to the invention.

With reference now to the drawing and more particularly FIGS. 1 and 2 thereof, there are shown exemplary embodiments of the invention with portions of the reflectors cut away to illustrate light sources. Thus the generally isoradiant spheroidal reflecting surface 11 shown in FIG. 1 surrounds a light bulb 12 having its center located essentially at the focal point of the reflecting surface on the axis of revolution and supported in a socket 13 having its base adjacent to the apex 14 of the reflector and energizable through the wires 15. Similarly the reflecting surface 16 in FIG. 2 comprises an isoradiant hyperboloidal surface according to the invention surround light bulb 17 having its center at the focal point of reflecting surface 16 along the axis of revolution supported in a base 18 that is adjacent to the apex 21 of reflecting surface 16 and energized through wires 22.

Figure 3:
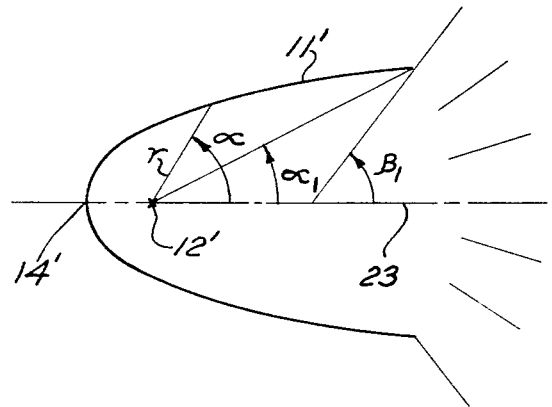
FIG. 3 illustrates the definition of the curve of rotation which defines the generally quasi-spheroidal reflecting surface of FIG. 1.

Referring to FIG. 3, there is shown a curve designated 11', which when rotated about the axis 23 upon which focal point 12' and apex 14' lie, defines the reflecting surface 11 in FIG. 1. The curve 11' is defined by the following equation in two dimensional polar coordinates with the origin of the coordinate system corresponding to the focus 12'.

$$r/f = \frac{\sqrt{k}(f(\alpha)+1)}{f(\alpha)+k}[(\sqrt{k}+k)(f(\alpha)-1)/(\sqrt{k}-1)(f(\alpha)+k)]^{\frac{k-1}{k+1}}$$

(1)

where $$k = \frac{1-\cos \alpha_1}{1-\cos \beta_1}$$

and $$f(\alpha) = \sqrt{(k-1)\tan^2\frac{\alpha}{2}+k}$$

$r$ = radial distance from focus to any point on the surface
$\alpha$ = angle between radius $r$ and major axis toward apex of reflector
$\alpha_1$ = angle between radius to outer edge of reflector and major axis of reflector
$\beta_1$ = angle between margin of reflected beam and major axis toward beam
$f$ = focal length—or length of radius to apex of reflector (on major axis)

Figure 4:
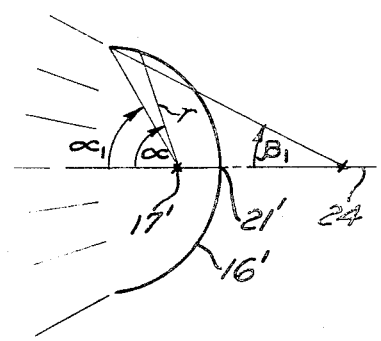
FIG. 4 illustrates the curve, which when rotated, defines the quasi-hyperboloidal surface of FIG. 2.

Referring to FIG. 4, there is shown the curve 16' which when rotated about the axis 24 including the focal point 17' and apex 21', defines the reflecting surface 16 of FIG. 2. The curve 16' is defined by the following equation in polar coordinates having an origin at the focus 17′ and with the symbols corresponding exactly to those in the equation above defining curve 11′ shown in FIG. 3.

$$r/f = \frac{\sqrt{k(f(\alpha)-1)}}{k-f(\alpha)}[(k-\sqrt{k})(f(\alpha)+1)/\sqrt{(k+1)}(k-f(\alpha))]^{\frac{k-1}{k+1}} \quad (2)$$

Figure 5:
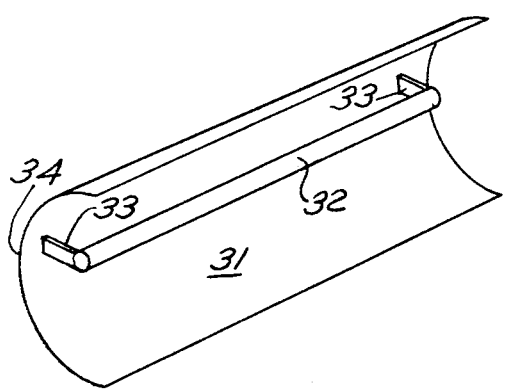
FIG. 5 is a trough-type reflecting surface according to the invention defined by a curve translated parallel to a line.
Figure 6:
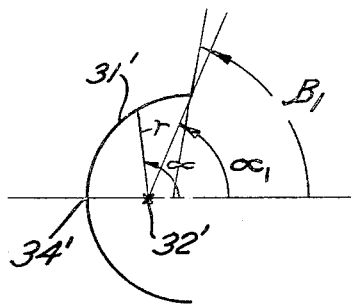
FIG. 6 illustrates the curve, which when translated, defines the trough-type reflecting surface of FIG. 5.

The invention may also be employed for providing illumination of essentially constant intensity throughout a prescribed angle $\beta_1$ in a plane normal to the lengthwise axis of a trough-type reflector, such as shown in FIG. 5 in which the source of illumination is preferably the approximation of a line source rather than a point source located upon a line passing through the focal point of the surface. In this case the curve defining the surface corresponds essentially to a section through the reflecting surface and is defined by a simpler polar equation.

In FIG. 5 the trough reflecting surface 31 embraces a line light source 32 having its axis corresponding to the focal line of the trough reflector 31 and supported by mountings 33 located along the apex line 34 of trough reflecting surface 31. Line source 32 might be an incandescent filament, a xenon flash tube or a fluorescent tube, for example. The curve 31′ defining the reflecting surface 31 when moved parallel to a line passing through focal point 32′ which, with apex 34′, defines a line about which curve 31′ is symmetrical, is defined by the following equation in two dimensional polar coordinates where the origin is at the focus 32′:

$$\frac{r}{f} = (\cos \alpha/k)^{-k} \quad (3)$$

where $$k = \frac{2}{1-\beta_1/\alpha_1}$$

This expression differs from the previous expression in that radial rather than polar distribution of light is involved, and applies to both the isoradiant generally elliptical trough section and the isoradiant generally hyperbolic trough section with the angle $\beta_1$ being positive for the general elliptical trough section and negative for the generally hyperbolic trough section.

In practical embodiments of the invention, it may be desirable to form the reflecting surfaces with central holes at the apex to admit the lamp socket which hole is sufficiently large to provide a corresponding blank region or deviation from uniformity in a portion of the beam. This anomaly can be corrected experimentally or by graphically integrating the equations, by ray tracing techniques for a specific reflector, or by any other method which might be devised for generating a geometric reflecting surface which provides uniformly intense reflections through space, either radial or polar, from a light source, A surface so generated is no longer precisely defined by the equations hereinbefore presented, which apply precisely only to reflectors without such holes or other removed areas. The scope of this invention is understood to include all isoradiant surfaces, radial and polar, with or without surface interruptions. Where, as illustrated in the specific embodiments shown, the openings are small compared to the openings of the reflector, this nonuniformity is generally insignificant from the practical standpoint.

There have been described novel reflecting surfaces capable of providing a beam of radiant energy of essentially constant intensity throughout substantially its entire solid angle. While the specific reflecting surfaces described herein have shown as an example light bulbs as the source of radiant energy, it is apparent that other energy sources, such as microwave radiating elements, may be employed within the principles of the invention. Since those skilled in the art may now make numerous modifications and uses of and departures from the specific embodiments described herein without departing from the inventive concepts, the invention is to be construed as limited soley by the spirit and scope of the appended claims.

What is claimed is:

1. An isoradiant nonsperical reflecting surface comprising, means exactly defining a nonspherical reflecting surface having substantially each point thereon facing a focal point located on an axis so that rays incident from said focal point upon each point of said surface emerge therefrom to define a bundle of nonparallel rays forming a beam of radiant energy of substantially uniform intensity in response to an isoradiant energy source at the radiant energy center corresponding substantially to said focal point, wherein said nonspherical reflecting surface intersects a plane including said axis and said focal point at a curve of intersection substantially defined in polar coordinates by an equation relating the dependent variable ratio of distance from said focal point to points on said curve of intersection to the distance along said axis between said focal point and the apex of said reflecting surface to an independent variable comprising a function of the angle between said axis and said points on said curve of intersection which function includes at least a first constant determined by the angle between said axis and the line joining said focal point with the point on said curve of intersection furthest from said apex and said axis and a second constant determined by the angle between said axis and the margin of a beam of substantially uniform intensity reflectable from said reflecting surface.

2. An isoradiant nonspherical reflecting surface in accordance with claim 1 wherein said equation is Equation 1 set forth below:

$$r/f = \frac{\sqrt{k(f(\alpha)+1)}}{f(\alpha)+k}[(\sqrt{k}+k)(f(\alpha)-1)/(\sqrt{k}-1)(f(\alpha)+k)]^{\frac{k-1}{k+1}} \quad (1)$$

where $$k = \frac{1-\cos \alpha_1}{1-\cos \beta_1}$$

and $$f(\alpha) = \sqrt{(k-1)\tan^2\frac{\alpha}{2}+k}$$

$r$ = radial distance from focus to any point on the surface
$\alpha$ = angle between radius $r$ and major axis toward apex of reflector
$\alpha_1$ = angle between radius to outer edge of reflector and major axis of reflector
$\beta_1$ = angle between margin of reflected beam and major axis toward beam
$f$ = focal length—or length of radius to apex of reflector (on major axis).

3. An isoradiant nonspherical reflecting surface in accordance with claim 1 wherein said equation is Equation 2 set forth below:

$$r/f = \frac{\sqrt{k(f(\alpha)-1)}}{k-f(\alpha)}[(k-\sqrt{k})(f(\alpha)+1)/(\sqrt{k}+1)(k-f(\alpha))]^{\frac{k-1}{k+1}} \quad (2)$$

where $$k = \frac{1-\cos \alpha_1}{1-\cos \beta_1}$$

and $$f(\alpha) = \sqrt{(k-1)\tan^2\frac{\alpha}{2}+k}$$

$r$ = radial distance from focus to any point on the surface
$\alpha$ = angle between radius $r$ and major axis toward apex of reflector $\alpha_1$ = angle between radius to outer edge of reflector and major axis of reflector $\beta_1$ = angle between margin of reflected beam and major axis toward beam $f$ = focal length—or length of radius to apex of reflector (on major axis).

4. An isoradiant nonspherical reflecting surface in accordance with claim 1 wherein said equation is Equation 3 set forth below:

$$\frac{r}{r} = (\cos \alpha/k)^{-k} \quad (3)$$

where $$k = \frac{2}{1 - \beta_1/\alpha_1}$$

$r$ = radial distance from focus to any point on the surface $\alpha$ = angle between radius $r$ and major axis toward apex of reflector $\alpha_1$ = angle between radius to outer edge of reflector and major axis of reflector $\beta_1$ = angle between margin of reflected beam and major axis toward beam $f$ = focal length—or length of radius to apex of reflector (on major axis).

5. An isoradiant nonspherical reflecting surface in accordance with claim 1 and further comprising, means defining a source of radiant energy embracing said focal point for providing radiant energy for reflection from said reflecting surface to form said beam.

6. An isoradiant nonspherical reflecting surface in accordance with claim 2 and further comprising, means defining a source of radiant energy embracing said focal point for providing radiant energy for reflection from said reflecting surface to form said beam.

7. An isoradiant nonspherical reflecting surface in accordance with claim 3 and further comprising, means defining a source of radiant energy embracing said focal point for providing radiant energy for reflection from said reflecting surface to form said beam.

8. An isoradiant nonspherical reflecting surface in accordance with claim 4 wherein said reflecting surface comprises a trough having a line of said focal points and further comprising, means defining a source of radiant energy embracing a line along a length of said line of focal points for providing radiant energy for reflection from said reflecting surface to form said beam.

References Cited

UNITED STATES PATENTS

| 1,762,469 | 6/1930 | Cline et al. | 240—104 |
| 1,800,886 | 4/1931 | Dunlap | 240—103 |
| 2,050,035 | 8/1936 | Benford | 240—41.35 |
| 3,152,765 | 10/1964 | Wohlers | 240—103 |

NORTON ANSHER, *Primary Examiner.*

RICHARD M. SHEER, *Assistant Examiner.*